Patented June 3, 1924.

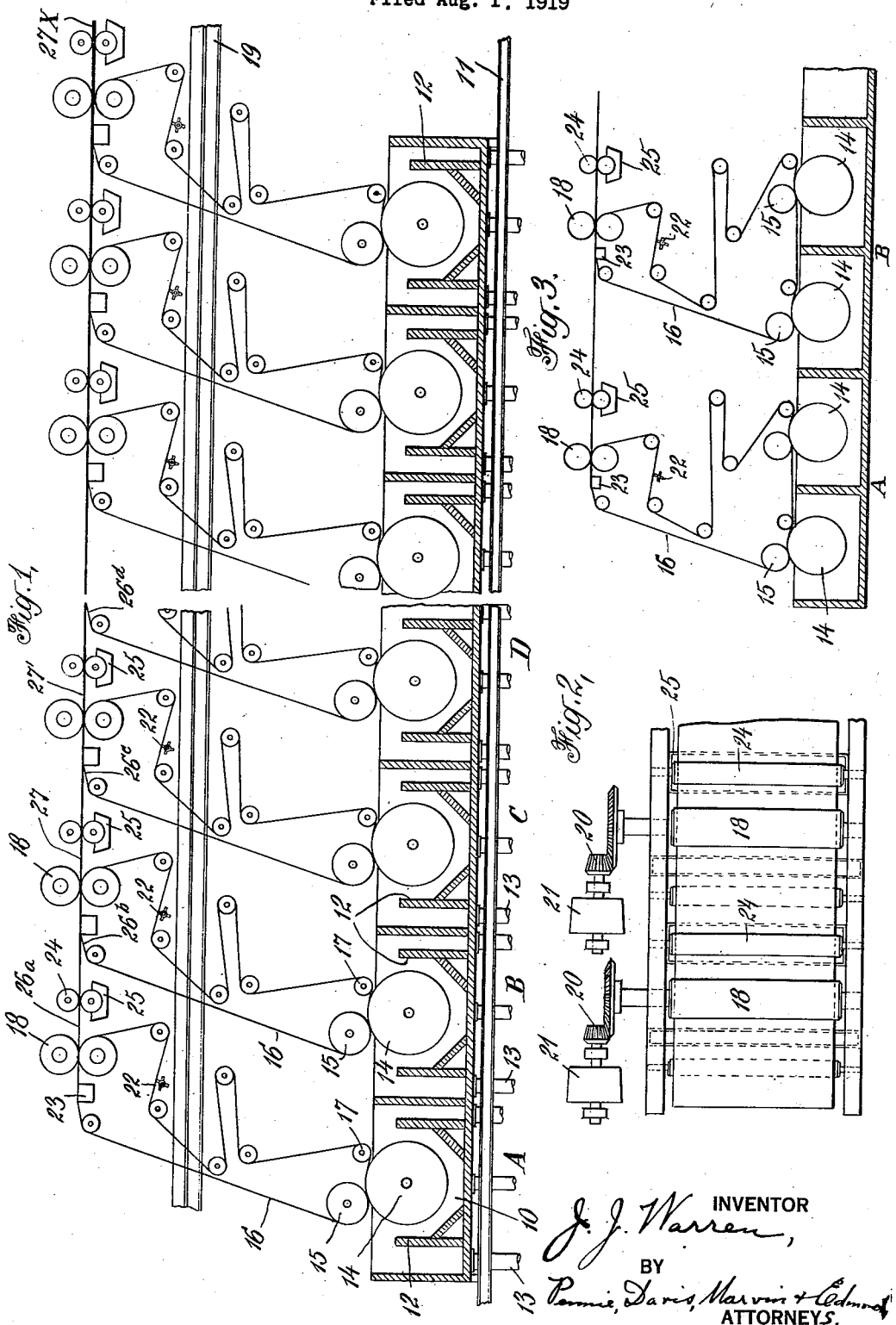

1,496,040

UNITED STATES PATENT OFFICE.

JOHN J. WARREN, OF BROWNVILLE, NEW YORK.

MANUFACTURE OF IMITATION LEATHER AND THE LIKE.

Application filed August 1, 1919. Serial No. 314,794.

*To all whom it may concern:*

Be it known that I, JOHN J. WARREN, a citizen of the United States, residing at Brownville, in the county of Jefferson, State of New York, have invented certain new and useful Improvements in the Manufacture of Imitation Leather and the like; and I do hereby declare the following to be a full, clear, and exact description of the invention, such as will enable others skilled in the art to which it appertains, to make and use the same.

This invention relates to the manufacture of multiple-ply paper products, such as imitation leather and the like. In the usual methods of making products of this character, the stock which is chemically treated in a manner to impart the desired characteristics to the finished product is wound on the roll of any ordinary wet machine until a sheet of the desired thickness is obtained, after which it is cut from the roll and dried in the air. The limitations imposed by the apparatus used in these methods prevent the formation of long continuous webs. When it is attempted to produce such webs on ordinary multiple-ply-cylinder machines, difficulty is encountered, due to the fact that the stock is heavy and has slight adhesive qualities, so that the plies cannot be put together by simply passing the felt over one cylinder after another until the desired thickness is obtained, as in the manufacture of ordinary multiple-ply paper. The stock does not adhere to the felt and after a few plies have been added, its weight will cause it to drop off of the felt into the cylinder vat.

It is an object of this invention to provide a method of manufacturing paper products of the character referred to, which will enable long continuous webs of material of any desired thickness to be rapidly and cheaply produced, and will otherwise overcome the disadvantages of the methods commonly employed for the production of such products.

In accordance with the invention the stock which has been previously prepared in a suitable manner is formed into a number of separate sheets, each composed of one or more plies, preferably by a series of cylindrical paper machines, and the several sheets while in wet condition are combined successively until a web of the desired thickness has been formed. After each sheet has been combined with the preceding sheets, the resulting web may be impregnated with a suitable liquid to impart the desired characterictics to the finished product, and preferably the initial sheet is also impregnated before it is united with the second sheet. The liquid may, however, be applied to the stock before it is formed into the sheets.

The particular nature of the invention will appear more clearly from a description of a preferred apparatus which may be employed for practicing the method, and which in itself constitutes a part of the invention. Figure 1 of the accompanying drawings represents in somewhat diagrammatic form an arrangement in which cylindrical paper machines are employed. Figure 2 is a plan view of part of the apparatus of Figure 1, and Figure 3 shows a modified arrangement of the apparatus.

In the drawings each of the reference characters 10 denotes a cylindrical paper-making unit of any suitable construction, all of these units being mounted upon the floor 11. Each of the units comprises in general a tank 12 provided with the necessary pipes 13 for supplying stock and water to the cylinders, for conveying circulating water from the tanks and for other purposes customary with apparatus of this character, but since the piping systems form no part of the present invention, they have not been shown in detail. In each of the tanks is a rotary cylinder 14 above which is a couch roll 15 supported in any suitable manner (not shown) and over which passes a felt 16.

In the arrangement of apparatus shown in Figure 1, each of the cylinders 14 is provided with an individual felt which travels over suitable guide-rolls 17 and between press rolls 18, which may be located upon an upper floor 19 and driven by gears 20 and pulleys 21. Each of the felts is also provided with a tightener 22 of any suitable construction, and before passing through the press rolls 18 each felt travels over a suitable suction box 23. There are associated with each felt and its press rolls and suction box impregnating rolls 24 adapted to take up from a tank 25 and apply to the sheets a suitable liquid for imparting to the final products the general characteristics, which will give them the appearance of artificial leather, or any other material that is being manufactured upon the machine. Since the impregnating rolls may be of any suitable construction and provided with all necessary means of adjustment, no particular form of rolls has been shown in the drawing.

In the arrangement of apparatus shown in Figure 3, each unit of the machine comprises a pair of cylinders 14 having a common felt 16, suction box 23, press rolls 18, and impregnating rolls 24, so that two-ply sheets are produced by each unit of the machine. It will also be understood that each unit of the machine may include more than two cylinders, so that multiple-ply sheets may be produced, but, as stated above, the weight and lack of adhesive qualities of the stock used for the formation of artificial leather render it impracticable to attempt to combine more than two or three plies.

In the practice of the method of the invention, the stock before being supplied to the tanks of the cylinders is suitably treated. The stock is then conveyed to the units of the apparatus, and the sheet of paper produced by the cylinders is carried upwardly over the couch roll 15 by the felt 16. During the passage of the sheets over the suction boxes 23, the greater portion of the water will be removed, so that the sheets will enter the press rolls 18 in a partly dried condition. As appears most clearly in Figures 1 and 3, the sheet $26^a$ produced by unit A at the left-hand end of the diagram will after leaving the press rolls 18 of this unit, pass through the impregnating rolls 24 of the same unit, after which it will be brought into engagement with the wet sheet $26^b$ produced on the next unit, that is, unit B, and the suction box 23 of this unit will remove most of the water from the wet sheet after which the two sheets will pass through the press rolls 18 of the second unit and be united into a web 27, and will then pass through the impregnating rolls 24 of this second unit, so that the desired liquid is applied to the side of the web formed by the second sheet. The two-sheet web thus produced will pass on and be combined in a similar manner with the wet sheet $26^c$ produced by the third unit C, and the three-sheet web 27' resulting from this stage of the operation will be impregnated by the rollers 24 of the third unit and pass on to the next unit D, where a fourth sheet $26^d$ will be combined with the three previously produced, and a four-sheet web will result. The operations described above will occur at each of the successive units throughout the length of the machine and ultimately the web $27^x$ will be brought to the desired thickness and conveyed away from the machine for subsequent treatment.

The invention thus provides a process of producing imitation leather and the like in which a plurality of sheets are formed out of suitable stock and then combined successively when in a wet condition, so that they become firmly united into a web of progressively increasing thickness. Each of the sheets may comprise a single ply of material, or may be composed of several plies, the number depending upon the weight, the adhesive qualities of the material, and other characteristics which determine the number of plies that will adhere to each other upon the felt of each unit of the machine.

The substances employed for impregnating the sheets to impart the required characteristics to the finished product may be added to the stock in the tanks, but it is preferred to apply the substances to the sheets by means of the impregnating rolls 24, in which case the first sheet will be given an initial impregnation before being combined with the second sheet, and after each successive sheet has been added to the web, the web will be passed through the impregnating rolls so that the desired liquid is applied to the web throughout its entire thickness, resulting in the production of a multiple-sheet web of uniform texture and appearance, particularly adapted for use as imitation leather and analogous materials. On account of the arrangement of applying the sheets successively throughout the operation of making the web, the latter may be made up of any desired number of sheets and each additional sheet will be given the same treatment, so that there is obtained a product in which the component sheets are united to form a uniform web, which may be of any desired length.

I claim:

1. The herein described process of producing imitation leather and the like, which consists in producing out of suitable stock a plurality of webs of material, combining the webs successively while in wet condition to make up a web of the desired thickness, and impregnating the composite web after each successive web has been added to impart the desired characteristics.

2. The herein described process of producing imitation leather and the like, which consists in producing a plurality of webs of material, impregnating one of the webs and thereafter uniting it with another of the webs when in wet condition, impregnating the two united webs, and adding to the composite web successive webs one at a time in wet condition to produce a multiple-ply web of desired thickness, and impregnating the web resulting from each successive addition of a sheet.

3. Apparatus for the production of continuous webs of multiple-ply paper, comprising a series of cylindrical paper-making units, a felt associated with each unit for taking off the web of paper produced thereon, press rolls associated with each unit for uniting in wet condition the web produced thereon with the sheets produced by preceding units of the series, and an impregnating device associated with each set of press rolls for treating the webs of paper after they have been united by the rolls.

In testimony whereof I affix my signature.

JOHN J. WARREN.